United States Patent

[11] 3,612,456

| [72] | Inventor | William V. Palmer<br>11841 Franklin Ave., Franklin Park, Ill.<br>60131 |
|---|---|---|
| [21] | Appl. No. | 863,438 |
| [22] | Filed | Oct. 3, 1969 |
| [45] | Patented | Oct. 12, 1971 |

[54] SUPPORT DEVICE FOR MEASURING GAGES
5 Claims, 4 Drawing Figs.

[52] U.S. Cl. .................................................. 248/125,
73/105, 248/186
[51] Int. Cl. .......................................... A47g 29/00,
G01b 5/28
[50] Field of Search .......................................... 248/122,
125, 161, 185, 186, 278, 411, 413, 124, 279;
33/72, 147 F, 147 G; 73/105

[56] References Cited
UNITED STATES PATENTS
| 1,125,939 | 1/1915 | Berger | 248/186 |
|---|---|---|---|
| 1,341,546 | 5/1920 | Davis | 33/147 G |
| 2,177,399 | 10/1939 | Aller | 248/125 |
| 2,240,536 | 5/1941 | Woxen | 73/105 |
| 3,362,668 | 1/1968 | Reinhart | 248/125 |
| 3,367,612 | 2/1968 | Usiskin | 248/278 |
| 3,428,915 | 2/1969 | Leone et al. | 248/487 |

FOREIGN PATENTS
| 564,209 | 9/1944 | Great Britain | 73/105 |

*Primary Examiner*—Marion Parsons, Jr.
*Attorney*—Wolfe, Hubbard, Leydig, Voit & Osann ABSTRACT: A support device for measuring gages is provided, which accurately and securely locates a measuring gage in a desired position. The device comprises an integrally formed fork-shaped member, adapted to be mounted on an upstanding column and having two tines, one of which supports the measuring gage. An adjusting screw, carried by the other tine deflects the gage-supporting tine up or down over a small range of distances for accurately locating the gage plunger in a desired position. Coarse adjustments of the gage plunger may be made by moving the gage on its tine support, and also by moving the gage support device upon the column.

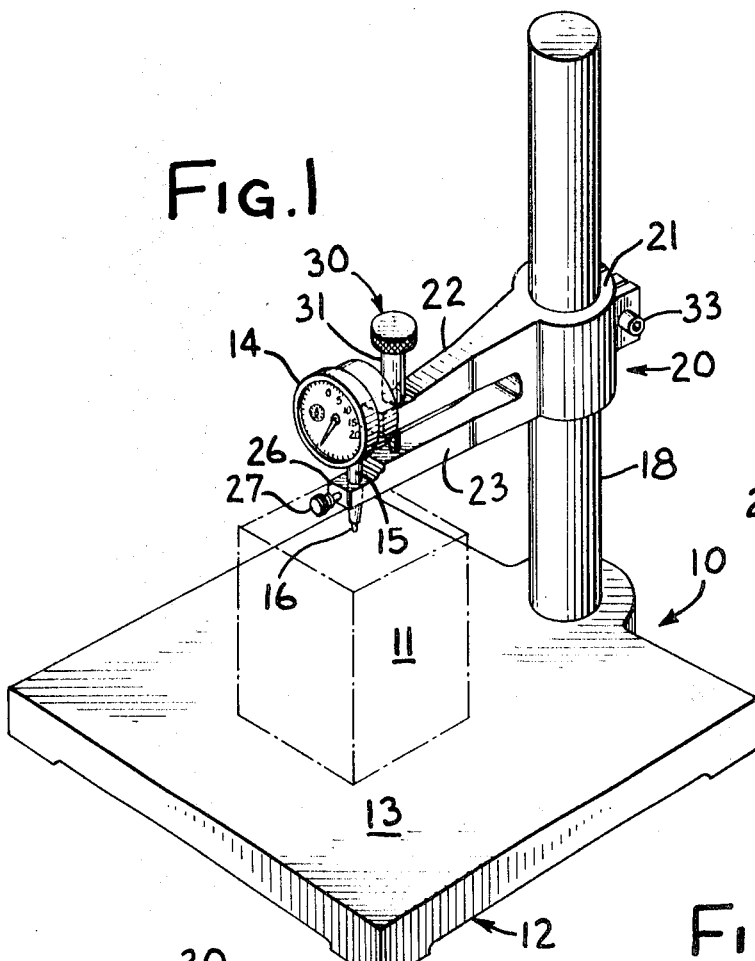
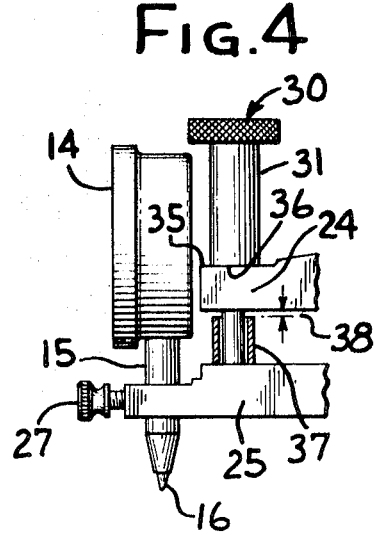
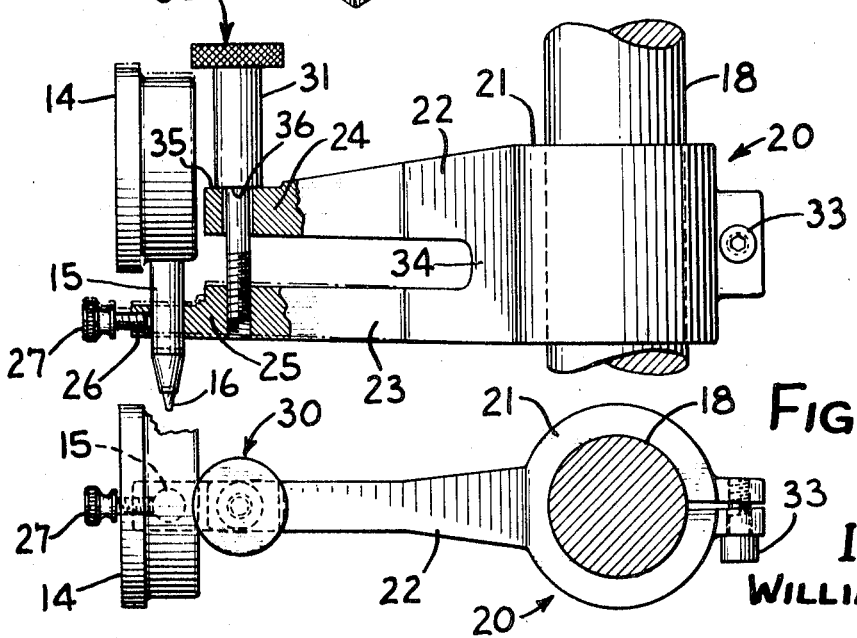
Fig. 1
Fig. 4
Fig. 2
Fig. 3
INVENTOR
WILLIAM V. PALMER
by: Wolfe, Hubbard, Voit & Osann
ATTYS.

SUPPORT DEVICE FOR MEASURING GAGES

DESCRIPTION OF THE INVENTION

This invention relates generally to supporting devices for measuring gages and more particularly concerns a device for accurately and rigidly locating a supported measuring gage.

In the past, supports for workpiece dimension measuring gages and the like have included a number of parts, pivotally or otherwise connected together, for supporting and adjusting the location of the measuring gage. Such devices are relatively expensive to manufacture, since the pivots, slides and other movable parts must be accurately and carefully made. In use, such supports require considerable manipulation in order to properly locate the supported gage plunger for a desired measurement setting. Moreover, if resetting is necessary for a plurality of measurements on workpieces or if the support is accidentally jarred or bumped by the gage user, and the gage knocked out of its carefully located position, the process of gage alignment must be laboriously redone.

Accordingly, it is the primary aim of this invention to provide a measuring gage support device which will eliminate these difficulties and which will both accurately position and thereafter rigidly hold the supported gage.

More specifically, it is an object to provide a novel measuring gage support device which can be used to accurately locate the measuring plunger of a supported gage in any desired position with a minimum of effort required by the user to make the setting desired. It is a related object to provide a measuring gage support which will positively prohibit the located gage plunger from being accidently jarred out of the desired position.

It is another object to provide a measuring gage support which is durable, easily manufactured, and easily used by even unexperienced personnel.

Other objects and advantages of the invention will become apparent upon reading the following detailed description and upon reference to the drawings, in which FIG. 1 is a perspective view showing the gage support device installed upon a standard and supporting a gage for measuring the dimension of objects passed thereunder, FIG. 2 is a detailed elevational view of the gage support device, showing in partial section the gage-adjusting means, FIG. 3 is a detailed plan view of the gage support device, and FIG. 4 is a fragmentary elevational view in partial section showing the use of a stop member with the gage support adjusting means.

While the invention will be described in connection with a preferred embodiment, it will be understood that I do not intend to limit the invention to that embodiment. On the contrary, I intend to cover all alternative, modifications and equivalents as may be included within the spirit and scope of the invention.

Turning first to FIG. 1, there is shown, in toto, a measuring device 10. In this case, the device is used for checking the dimensional accuracy or measuring the height of objects 11, as is often required in the modern manufacture of metal parts of various sorts. To provide a plane of reference, a base 12 is provided with a carefully machined flat surface 13 which may be ground and lapped flat to perhaps 0.00007-inch tolerance. For measuring the height of the objects 11, a gage 14 having a stem 15 and plunger 16 for contacting the top of the object is provided. To support the gage in the illustrated position, the base 12 is provided with a standard or spindle 18 and the novel gage support device 20.

In operation, a calibrating object 11 of known height is located upon the base surface 13. The gage support device 20 and gage 14 are then brought into the illustrated position. As explained hereafter, the location of the gage 14 is then adjusted until a zero or other desired reading is obtained upon the gage dial face. The gage 14 is then clamped in place, the test object 11 is then removed and other objects 11, whose height is desired to be known, are passed over the base surface 13 and under the gage plunger 16 for measuring.

In accordance with the invention, the gage-supporting device 20 is a generally fork-shaped member and includes a standard- or spindle-engaging portion 21, which may take the illustrated form of an elongated collar portion. For supporting and adjusting the location of the gage 14, the gage device 20 has a pair of spaced parallel tines 22 and 23 which, in the illustrated embodiment, are cast or otherwise formed integrally with the standard-engaging collar portion 21 and are preferably positioned perpendicularly to the axis of the spindle 18. It will be noted that each tine 22 and 23 terminates in a free end 24 and 25, respectively, and that at least one tine 23 is provided with means 26 for supporting the measuring gage 14. As illustrated, the gage-supporting means 26 may consist of a setscrew 27 which operates to secure the gage stem 15 within a hole provided in the lower tine 23. It is a feature of the invention that the free end 25 of one tine 23 protrudes beyond the free end 24 of the other tine 22 and is formed for supporting the measuring gage 14 without interference by the first tine.

Further in accordance with the invention, adjusting means 30 is located adjacent the free ends 24 and 25 of the tines for adjusting the distance therebetween. In the specific embodiment shown, an adjusting screw 31 is located adjacent the free ends 24 and 25 of the tines and bears upon one of the tines 22. Preferably, the adjusting screw 31 projects through the tine 22 and threadably engages the opposite tine 23. By rotating the adjusting screw 31, the distance between the free ends of the tines may be infinitely adjusted over a given small range. More specifically, it may be seen in FIG. 2 that by operating the adjusting screw 31, the free end 25 and attached gage 14 may be moved from the positions shown in a solid line to those shown in dotted lines; in this manner, the supported measuring gage 14 may be positioned at a reselected location within the given adjustment range. For a gage-supporting fork device having an overall length of about 6 and ¾ inches, this range of adjustment is on the order of 0.030 inches. As noted above, the gage support fork 20 and gage 14 are initially located in approximately the proper position by moving the gage support fork 20 along the standard 18, clamping the support fork in the desired location by tightening a clamp screw 33, and locating the gage stem 15 in position by means of a setscrew 27. Once so positioned, the gage 14 is securely positioned; experimentation has shown that even when the shock of a 10 pound mallet being dropped on the base 12 will not jar the gage 14 from its selected position.

In order to enhance the rigidity of the support in accordance with the invention, one tine 22 in the illustrated embodiment is provided with a larger cross-sectional area near the spindle-engaging portion 21 that at the free end 24. Such construction assures that the gage-carrying tine 23 will prove the majority of the gage-adjusting motion when the adjusting screw 31 is tightened.

It is, as noted above, a feature of the invention that the adjusting screw 31 bears upon one of the tines 22 of the fork, projects through the tine and threadably engages the opposite tine 23. Such arrangement allows location of a bearing embossment 35 upon an easily machined outside surface of the support fork, rather than upon a more inaccessible inner surface. Moreover, a large bearing surface is presented upon the embossment 35 and upon the mating surface 36 of the adjusting screw, since the tine 22 bears upon the adjusting screw 31 at a point intermediate the end of the screw. Use of these large bearing surfaces inhibit the development of uneven wear spots thereupon, which interfere with accurate adjustment of the gage location. Furthermore, the free ends 24 and 25 of the tines are pulled toward each other from the unstressed condition shown in solid lines in FIG. 2 by the action of the adjusting screw, thereby minimizing the internal stresses development within the relatively sharp juncture 34 of the tines. Such stress minimization inhibits damage or breakage of this cast member.

In accordance with a further aspect of this invention, a stop member 37, as illustrated in FIG. 4, may be included for limiting the distance 38 which the tine free ends 24 and 25 may be pulled toward each other from the unstressed condition by the adjusting screw 31. Such stop member 37 provides a limit for the range of distance through which the plunger 16 of the gage may be adjusted. Such member also prevent excessive tightening of the adjusting screw 31; such excessive tightening may make subsequent release of the adjustment stresses difficult, or may lead to damage of the gage-supporting fork.

I claim as my invention:

1. In a measuring gage supporting arrangement utilizing a base and an upstanding standard affixed thereto, the combination therewith of,
   a gage-supporting device, said device being substantially fork shaped and including a standard-engaging portion, and a pair of spaced tines formed integrally with the standard-engaging portion, each tine having a free end and at least one tine having a larger cross-sectional area adjacent the standard-engaging portion that at the free end,
   adjusting means located adjacent the free ends of the tines for adjusting the distance therebetween, and
   one of said tine projecting beyond the free end of the other tines and having means for supporting a measuring gage without interference from said other tine.

2. A gage-supporting device according to claim 1, wherein said adjusting means includes an adjustment screw, said screw threadably engaging one tine and bearing upon the other tine at a point intermediate the ends of the screw.

3. A gage-supporting device according to claim 2, wherein said free end of said gage-supporting tine is pulled toward the other tine from an unstressed position by the action of said adjusting screw.

4. A gage supporting device according to claim 3, wherein a top member is interposed between said tines for limiting the distance which said gage-supporting tine free end may be pulled toward the other tine from said unstressed condition by said adjusting screw.

5. In a measuring gage supporting arrangement having a base and a spindle affixed upright thereto, the combination therewith of,
   a generally fork-shaped gage-supporting device, including an elongated collar portion for rigidly engaging the spindle,
   a pair of spaced parallel tines integrally formed with the collar portion and positioned perpendicularly to the spindle axis,
   each tine having a free end,
   the free end of one tine protruding beyond the free end of the other tine and having means for supporting a measuring gage without interference from first tine,
   and an adjusting screw located adjacent the free end of the other tine for bearing upon a selected tine, said screw projecting through said selected tine and threadably engaging the opposite tine for infinitely adjusting the distance between the free end of the tine over a given range so as to calibrate a supported measuring gage at a preselected reading within said given range.